United States Patent
Martin et al.

(10) Patent No.: US 12,072,599 B2
(45) Date of Patent: Aug. 27, 2024

(54) PRETREATMENT OF TRANSPARENT CONDUCTIVE OXIDE (TCO) THIN FILMS FOR IMPROVED ELECTRICAL CONTACT

(71) Applicant: View, Inc., Milpitas, CA (US)

(72) Inventors: Todd William Martin, Mountain View, CA (US); Abhishek Anant Dixit, Collierville, TN (US); Fabian Wilbur Strong, Hayward, CA (US); Anshu Ajit Pradhan, Collierville, TN (US)

(73) Assignee: View, Inc., San Jose, CA (US)

( * ) Notice: Subject to any disclaimer, the term of this patent is extended or adjusted under 35 U.S.C. 154(b) by 0 days.

(21) Appl. No.: 18/452,427

(22) Filed: Aug. 18, 2023

(65) Prior Publication Data

US 2023/0393442 A1    Dec. 7, 2023

Related U.S. Application Data

(60) Continuation of application No. 18/049,626, filed on Oct. 25, 2022, now Pat. No. 11,762,254, which is a continuation of application No. 16/826,086, filed on Mar. 20, 2020, now Pat. No. 11,513,411, which is a division of application No. 14/893,504, filed as application No. PCT/US2014/042178 on Jun. 12, 2014, now Pat. No. 10,656,492.

(60) Provisional application No. 61/834,372, filed on Jun. 12, 2013.

(51) Int. Cl.
   *G02F 1/153* (2006.01)
   *G02F 1/155* (2006.01)

(52) U.S. Cl.
   CPC ............ *G02F 1/1533* (2013.01); *G02F 1/155* (2013.01); *G02F 2001/1536* (2013.01); *G02F 2001/1555* (2013.01); *G02F 2201/08* (2013.01)

(58) Field of Classification Search
   CPC ...... G02F 1/1523; G02F 1/1533; G02F 1/155; G02F 2001/1536; G02F 2001/1555; G02F 2201/08
   See application file for complete search history.

(56) References Cited

U.S. PATENT DOCUMENTS

| 5,353,705 A | 10/1994 | Lewis et al. |
| 6,337,758 B1 | 1/2002 | Beteille et al. |
| 6,529,308 B2 | 3/2003 | Beteille et al. |
| 7,911,674 B2 | 3/2011 | Gaskell et al. |

(Continued)

FOREIGN PATENT DOCUMENTS

| CN | 1763958 A | 4/2006 |
| CN | 101101872 A | 1/2008 |

(Continued)

OTHER PUBLICATIONS

Burdis, et al., "Focused R&D for Electrochromic Smart Windows: Significant Performance and Yield Enhancements", SAGE Electrochromics, Inc., DE-FC26-01NT41259, Final Report, Sep. 23, 2004.

(Continued)

*Primary Examiner* — Jack Dinh
(74) *Attorney, Agent, or Firm* — Weaver Austin Villeveuve & Sampson LLP; Brian D. Griedel

(57) ABSTRACT

Certain embodiments relate to optical devices and methods of fabricating optical devices that pre-treat a sub-layer to enable selective removal of the pre-treated sub-layer and overlying layers. Other embodiments pertain to methods of fabricating an optical device that apply a sacrificial material layer.

9 Claims, 8 Drawing Sheets

(56) References Cited

U.S. PATENT DOCUMENTS

| | | | |
|---|---|---|---|
| 8,300,298 | B2 | 10/2012 | Wang et al. |
| 10,656,492 | B2 | 5/2020 | Martin et al. |
| 11,513,411 | B2 | 11/2022 | Martin et al. |
| 11,762,254 | B2 | 9/2023 | Martin et al. |
| 2003/0219632 | A1 | 11/2003 | Schaepkens |
| 2006/0094147 | A1 | 5/2006 | Ulmer et al. |
| 2007/0210420 | A1 | 9/2007 | Nelson et al. |
| 2007/0264421 | A1 | 11/2007 | Meier et al. |
| 2009/0237820 | A1 | 9/2009 | McCabe et al. |
| 2009/0285978 | A1 | 11/2009 | Burdis et al. |
| 2009/0304912 | A1 | 12/2009 | Kwak et al. |
| 2010/0165439 | A1 | 7/2010 | Gaskell et al. |
| 2010/0245973 | A1 | 9/2010 | Wang et al. |
| 2010/0291431 | A1 | 11/2010 | Shih et al. |
| 2012/0038601 | A1 | 2/2012 | Huang et al. |
| 2012/0327499 | A1 | 12/2012 | Parker et al. |
| 2014/0022621 | A1 | 1/2014 | Kailasam et al. |
| 2014/0340731 | A1 | 11/2014 | Strong et al. |
| 2016/0109777 | A1 | 4/2016 | Martin et al. |
| 2020/0218124 | A1 | 7/2020 | Martin et al. |
| 2023/0074891 | A1 | 3/2023 | Martin et al. |

FOREIGN PATENT DOCUMENTS

| | | |
|---|---|---|
| CN | 101134814 A | 3/2008 |
| CN | 101170058 A | 4/2008 |
| CN | 102057323 A | 5/2011 |
| CN | 102336784 A | 2/2012 |
| CN | 102388340 A | 3/2012 |
| CN | 102388341 A | 3/2012 |
| CN | 102582159 A | 7/2012 |
| EP | 1691410 A2 | 8/2006 |
| JP | 2000075319 A | 3/2000 |
| JP | 2005001001 A | 1/2005 |
| JP | 2006155920 A | 6/2006 |
| JP | 2009514209 A | 4/2009 |
| JP | 2011035246 A | 2/2011 |
| JP | 2012523019 A | 9/2012 |
| KR | 20100092745 A | 8/2010 |
| WO | WO-2009139376 A1 | 11/2009 |
| WO | WO-2012177790 A2 | 12/2012 |
| WO | WO-2013022992 A2 | 2/2013 |
| WO | WO-2013049379 A1 | 4/2013 |
| WO | WO-2013090209 A1 | 6/2013 |
| WO | WO-2013106082 A2 | 7/2013 |
| WO | WO-2014066832 A1 | 5/2014 |
| WO | WO-2014201287 A1 | 12/2014 |

OTHER PUBLICATIONS

CA Office Action dated Mar. 31, 2022, in CA Application No. 2914763.
Canadian Office Action dated Aug. 7, 2020 in CA Application No. 2,914,763.
Canadian Office Action dated Jul. 9, 2021 in CA Application No. 2,914,763.
Chinese First Office Action dated Jun. 25, 2018 in CN Application No. 201480033512.6.
Chinese Notice of Allowance with Search Report dated Mar. 19, 2020 in CN Application No. 201480033512.6.
Chinese Second Office Action dated May 8, 2019 in CN Application No. 201480033512.6.
CN Examiner's telephone notification dated Dec. 31, 2019 issued in CN Application No. 201480033512.6.
CN Examiner's telephone notification dated Jan. 9, 2020 issued in CN Application No. 201480033512.6.
CN Office Action dated Aug. 23, 2022, in Application No. CN202010430270.1 with English translation.
CN Office Action dated Feb. 17, 2023 in Application No. CN202010430270.1 with English translation.
CN Office Action dated Sep. 19, 2023, in application No. CN202010430270.1, with English Translation.
EP Examination Report dated Dec. 10, 2020 in EP Application No. 14810785.7.
EP Examination Report dated Jun. 19, 2019 in EP Application No. 14810785.7.
EP Examination Report dated Nov. 22, 2018 in EP Application No. 14810785.7.
EP Extended European Search report dated Oct. 6, 2023, in Application No. EP23188618.5.
EP Search Report (extended) dated Jan. 20, 2017 in EP Application No. 14810785.7.
International Preliminary Report on Patentability dated Dec. 23, 2015 in PCT Application No. PCT/US2014/042178.
International Search Report dated Oct. 8, 2014 in PCT Application No. PCT/US2014/042178.
Korean Office Action dated Aug. 18, 2021 in KR Application No. 10-2015-7035064.
Korean Office Action dated Jun. 12, 2020 in KR Application No. 10-2015-7035064.
KR Notice of Final Refusal dated Apr. 19, 2021, in application No. KR20157035064 with English translation.
KR Office Action dated Dec. 3, 2021, in Application No. KR1020217029726 with English translation.
KR Office Action dated Jul. 25, 2022, in Application No. KR10-2021-7029726 with English translation.
Lampert, C.M., "Toward large-area photovoltaic nanocells: experiences learned from smart window technology," Solar Energy Materials And Solar Cells 32, 1994, pp. 307-321.
U.S. Notice of Allowance dated Jul. 21, 2022 in U.S. Appl. No. 16/826,086.
U.S. Final Office Action dated Mar. 3, 2022, in U.S. Appl. No. 16/826,086.
U.S. Notice of Allowance dated Nov. 3, 2022 in U.S. Appl. No. 16/826,086.
U.S. Notice of Allowance dated Aug. 17, 2023 in U.S. Appl. No. 18/049,626.
U.S. Notice of Allowance dated Feb. 26, 2020 in U.S. Appl. No. 14/893,504.
U.S. Notice of Allowance dated Jan. 24, 2019 in U.S. Appl. No. 14/893,504.
U.S. Notice of Allowance dated May 9, 2023 in U.S. Appl. No. 18/049,626.
U.S. Notice of Allowance dated Nov. 12, 2010 in U.S. Appl. No. 12/345,638.
U.S. Office Action dated Aug. 9, 2019 in U.S. Appl. No. 14/893,504.
U.S. Office Action dated Mar. 13, 2018 in U.S. Appl. No. 14/893,504.
Yavas O. et al., "Effect of substrate absorption on the efficiency of laser patterning of indium tin oxide thin films," Journal of Applied Physics, vol. 85, No. 8, Apr. 15, 1999, pp. 4207-4212.

PRETREATMENT OF TRANSPARENT CONDUCTIVE OXIDE (TCO) THIN FILMS FOR IMPROVED ELECTRICAL CONTACT

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

FIELD

Embodiments described herein generally relate to optical devices such as electrochromic devices, and methods of fabricating optical devices.

BACKGROUND

Various optically switchable devices are available for controlling tinting, reflectivity, etc. of window panes. Electrochromic devices are one example of optically switchable devices generally. Electrochromism is a phenomenon in which a material exhibits a reversible electrochemically-mediated change in an optical property when placed in a different electronic state, typically by being subjected to a voltage change. The optical property being manipulated is typically one or more of color, transmittance, absorbance, and reflectance. One well known electrochromic material is tungsten oxide (WO3). Tungsten oxide is a cathodic electrochromic material in which a coloration transition, transparent to blue, occurs by electrochemical reduction.

Electrochromic materials may be incorporated into, for example, windows for home, commercial, and other uses. The color, transmittance, absorbance, and/or reflectance of such windows may be changed by inducing a change in the electrochromic material, that is, electrochromic windows are windows that can be darkened or lightened electronically. A small voltage applied to an electrochromic device of the window will cause it to darken; reversing the voltage causes it to lighten. This capability allows for control of the amount of light that passes through the window, and presents an enormous opportunity for electrochromic windows to be used not only for aesthetic purposes but also for energy-savings.

With energy conservation being of foremost concern in modern energy policy, it is expected that growth of the electrochromic window industry will be robust in the coming years. An important aspect of electrochromic window fabrication is coating of thin films on glass to produce an electrochromic device stack, and patterning the device stack to make it functional. Part of the patterning process includes removing portions of the device stack to reveal underlying transparent conductive oxide (TCO) in order to fabricate electrical connections, e.g. bus bars, onto the exposed lower TCO and the upper TCO, in order to deliver electricity to them and thus impart a potential across the electrochromic device stack to drive its coloring function. Selectively removing these materials to reveal the underlying TCO may be problematic, e.g., depending upon the materials that make up the electrochromic device.

SUMMARY

Embodiments described herein generally relate to optical devices such as electrochromic devices, and methods of fabricating optical devices.

Certain embodiments pertain to a method of fabricating an optical device, where the method comprises, in the following order: (a) exposing a sub-layer of the optical device to an energy source, (b) depositing one or more material layers of the optical device on the sub-layer, and (c) ablating the one or more material layers and the sub-layer with a laser to expose an underlying layer.

Certain embodiments pertain to a method of fabricating an optical device, where the method comprises: i) applying a sacrificial material layer to a portion of the area of one or more sub-layers of the optical device, ii) depositing one or more material layers of the optical device on the sacrificial material layer and the one or more sub-layers, and iii) applying a laser to the portion to ablate the optical device at least down to the sacrificial material layer.

Regarding the area of the sacrificial layer in iii), the sacrificial material layer may be completely removed from the portion of the area of the one or more sub-layers or some of the area of the sacrificial layer may remain in the area to which it was applied. Regarding depth penetration into the sacrificial layer, in certain embodiments it is desirable to remove the sacrificial layer completely so that any sub-layers are cleanly exposed, e.g. an underlying transparent conducting layer may be exposed for application of a bus bar. In other embodiments, the sacrificial layer may remain after iii) to be removed in subsequent processing steps.

Certain embodiments pertain to an optically switchable device comprising a substantially transparent substrate, a lower conductor layer disposed over the substantially transparent substrate, and a bus bar on the lower conductor layer over a portion of the area of a substrate, wherein the remainder of the area has one or more material layers including a sacrificial material layer on a sub-layer on top of the bottom conductor layer.

These and other embodiments are described in more detail below.

DETAILED DESCRIPTION

Figure 1:
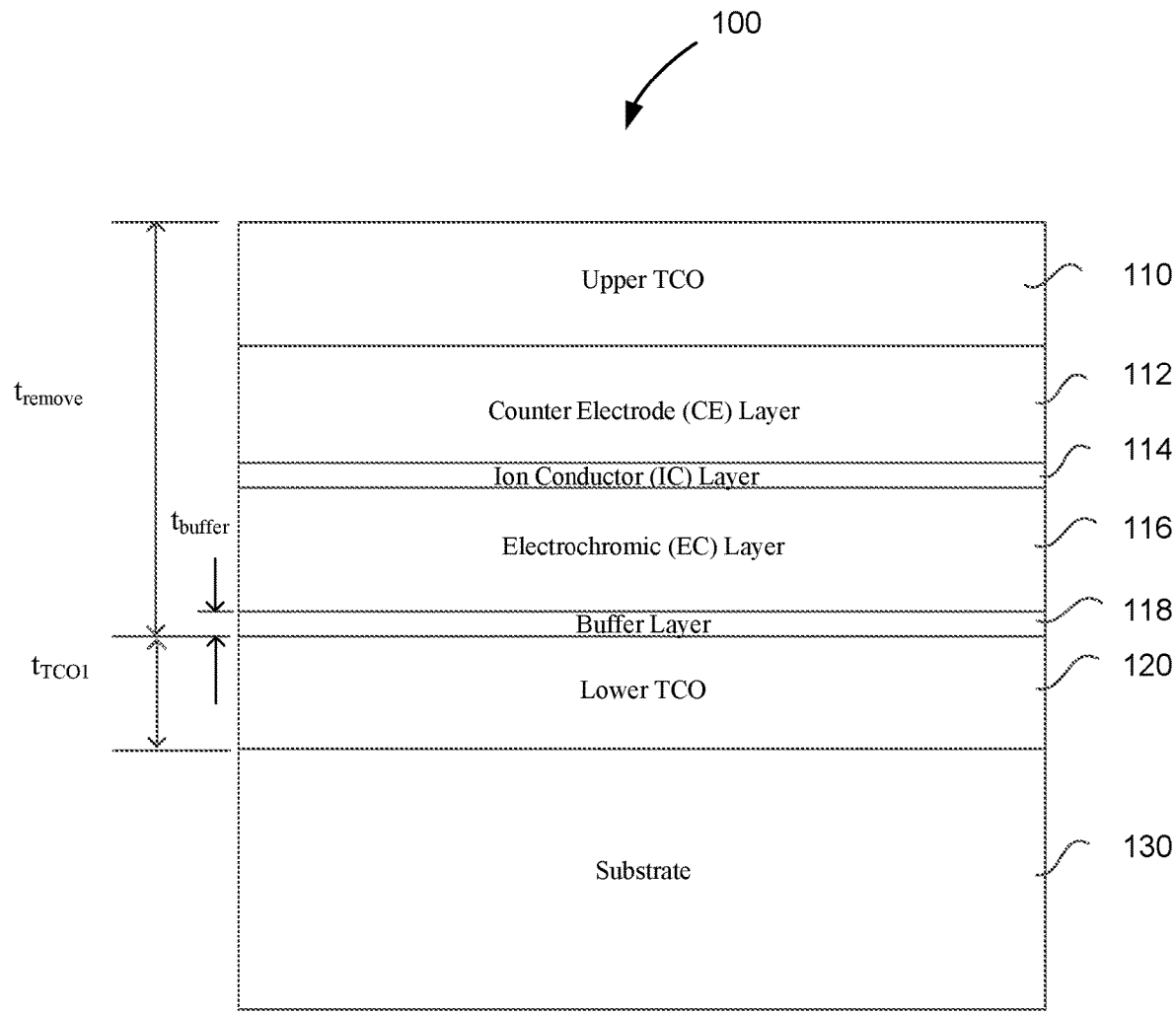
FIG. 1 depicts a schematic drawing of en electrochromic device disposed over a substrate in an electrochromic window construction, according to embodiments.

Embodiments described herein generally relate to optical devices and methods of fabricating optical devices. Optical devices include optically switchable devices, for example, electrochromic devices. Certain embodiments pertain to methods that pre-treat a sub-layer of an optical device during deposition of its material layers in order to change characteristics of that sub-layer to enable subsequent selective removal of the pre-treated sub-layer and overlying layers. Other embodiments pertain to methods of fabricating an optical device that apply a sacrificial layer during deposition of the layers of the optical device, and then ablate at least down to that sacrificial layer. These methods can be used to selectively remove thin films to reveal underlying transparent conductor layers, for example.

More specifically, pre-treatment embodiments relate to methods of fabricating an optical device that include pre-treating a sub-layer (e.g., one or more thin films) of the optical device to enable selective removal of the pre-treated sub-layer, and any additional material layer(s) deposited thereon. During fabrication of an optical device, for example, there may be one or more material layers that need to be removed to reveal an underlying layer. Pre-treatment operations described herein can locally alter the properties and morphology of the sub-layer to enable selective removal of the pre-treated area. For example, certain pre-treatment operations locally expose at least a portion of the sub-layer to a laser source for heat treatment or a localized plasma treatment of the surface. Some pre-treatment operations increase the absorptive properties of the sub-layer and/or decrease the absorptive properties of the underlying layer(s). Once pre-treated, the sub-layer may more readily absorb laser energy relative to the underlying layer. Pre-treatment enables selective removal of the pre-treated sub-layer and any material that may be deposited on that pre-treated sub-layer to uncover the underlying layer.

Certain material layers used in fabricating optical devices, e.g. electrochromic devices, comprise thin films that are largely transparent (i.e. with low absorptive properties) before pre-treatment and do not absorb laser energy efficiently. This makes these untreated material layers difficult to remove, for example, by laser ablation. In some cases, attempts to remove these untreated layers using laser ablation could undesirably remove a portion of the underlying layer as well. Even if the untreated material layers themselves are not difficult to remove, the combination of these layers and any additional material deposited thereon may be difficult to remove via laser ablation. In certain embodiments, the relative absorption properties of the pre-treated layer, any layers deposited over the pre-treated layer, and an underlying layer may be exploited in order to achieve selective removal with laser ablation. That is, pre-treating the sub-layer can increase the absorption properties of the sub-layer and/or decrease the absorption properties of the underlying layer. During subsequent laser ablation, the pre-treated layer may more readily absorb laser energy than the underlying layer, which allows for selective removal (or substantially removal) of the pre-treated sub-layer along with any material layers disposed thereon.

In certain embodiments, a method comprises (a) exposing a sub-layer of an optical device to an energy source, (b) depositing one or more material layers of the optical device on the sub-layer, and (c) ablating the sub-layer and the one or more material layers on the sub-layer using a laser, which exposes the underlying layer. In one instance, (a) is performed only to a portion of the entire accessible area of the sub-layer and (c) is performed to the corresponding portion on the top layer (i.e. the portion as perpendicular projected to the top layer of the one or more layers deposited on the sub-layer). This pre-treated portion will determine the portion that is selectively ablated later. The energy source used to expose (pre-treat) the sub-layer may be the same laser as used in (c), may be another laser, or may be plasma. In certain embodiments, the optical device may be an electrochromic device. In one embodiment where the optical devices is an electrochromic device, the method further comprises fabricating a bus bar on a lower conductor layer that is the underlying layer exposed in (c). These methods described herein can be integrated into other methods of fabricating optical devices. For example, these methods may incorporate one or more steps of the methods of fabricating electrochromic devices described in PCT International Application No. PCT/US2012/068817, titled "THIN-FILM DEVICES AND FABRICATION," and filed on Dec. 10, 2012, and U.S. patent application Ser. No. 13/456,056, titled "ELECTROCHROMIC WINDOW FABRICATION METHODS," filed on Apr. 25, 2012, both of which are hereby incorporated by references in their entirety.

Figure 2A:
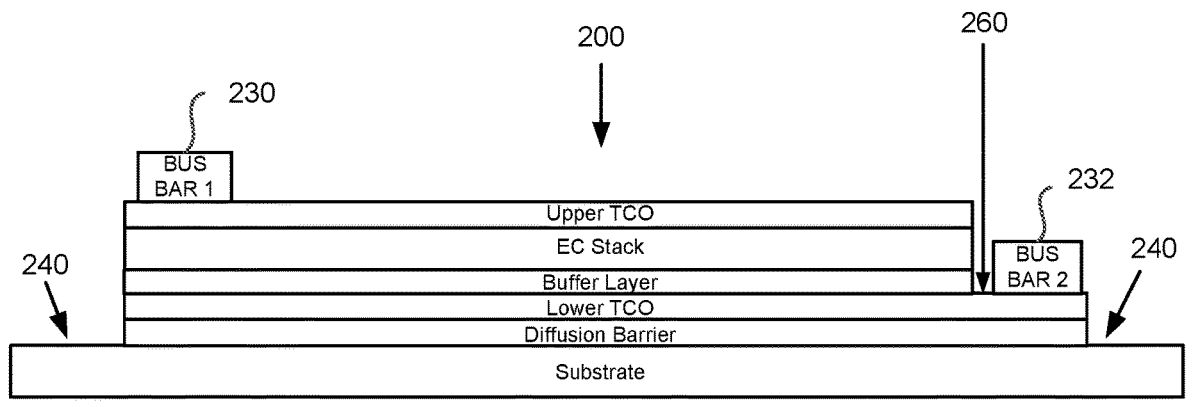
FIGS. 2A-2B are cross section schematic drawings depicting two side views of an electrochromic device disposed over a substrate, according to embodiments.
Figure 2B:
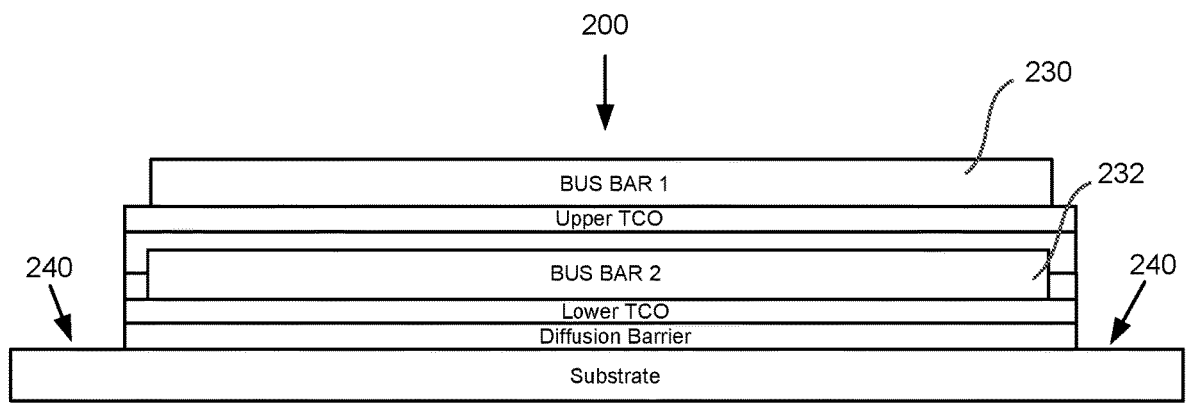

Although the methods of fabrication described herein are useful for any optical devices, for simplicity they are described in certain embodiments herein in terms of electrochromic (EC) devices. During fabrication of an electrochromic device on a substrate, for example, material from one or more layers may need to be removed to uncover a portion of an underlying layer for placement of structures in contact with the underlying layer. For example, in a bus bar pad expose operation, material layer(s) over an underlying conductor layer are removed to allow for application of a bus bar in electrical contact with the underlying conductor layer. As another example, in a laser edge deletion (LED) operation, material layers over the substrate are removed to allow for placement of a spacer and the primary seal in contact with the substrate, where the spacer is between two electrochromic windows in an insulated glass unit (IGU). Some examples of constructions of EC devices that could be fabricated using methods described herein are shown in FIG. 1 and FIGS. 2A and 2B. Other examples can be found in PCT International Application No. PCT/US2012/068817, titled "THIN-FILM DEVICES AND FABRICATION," and filed on Dec. 10, 2012, and U.S. patent application Ser. No. 13/456,056, titled "ELECTROCHROMIC WINDOW FABRICATION METHODS," filed on Apr. 25, 2012.

FIG. 1 depicts a cross-sectional view of a construction 100 including an electrochromic (EC) device fabricated on a substantially transparent substrate 130 (e.g., glass substrate), according to embodiments. The EC device comprises a buffer layer 118 (e.g., $TiO_2$ layer) disposed over a lower transparent conductive (TCO) layer 120 (e.g., fluorinated tin oxide layer). As depicted, the buffer layer 118 has the thickness, $t_{buffer}$. In some cases, the thickness of the buffer layer, $t_{buffer}$, is between about 10 and about 50 nm thick. The illustrated EC device further comprises an electrochromic stack including an electrochromic (EC) layer 116 (e.g., $WO_3$ layer), an ion conductor (IC) layer 114 (e.g. an appropriate lithium ion conducting material such as lithium tungstate), and a counter electrode (CE) layer 112 (e.g., an amorphous NiWO layer). As depicted, the lower TCO 120 has a thickness, $t_{TCO1}$ (e.g., about 350 nm). Although not shown, the thickness of the upper TCO 110 is $t_{TCO2}$ (e.g., about 350 nm). The IC layer 114 shown in FIG. 1 may be a separately deposited IC layer or may be an interfacial region created between the contacting and separately deposited EC layer 116 and the CE layer 112. The EC device further comprises an upper TCO 110 (e.g., indium tin oxide layer) disposed over the electrochromic stack. Although the depicted EC device was fabricated with the material layers and relative thicknesses shown, other thicknesses and stacking orders can be used in other embodiments. Also, it should be noted that in the example shown, the sacrificial layer is referred to as a "buffer" layer, though any material layer with the appropriate characteristics may be pretreated, overcoated with one or more material layers, and then selectively removed in the pretreated area.

The methods of fabricating optical devices described herein can be used with electrochromic devices such as the electrochromic device shown in FIG. 1. For example, the methods can be used to pre-treat a buffer layer, such as the buffer layer 118 in FIG. 1, before depositing an electrochromic stack. The material layers of the electrochromic stack and/or upper TCO can be laser ablated to remove the material layers down to and including the pre-treated buffer layer in order to uncover the underlying lower TCO. This may be done in preparation for applying a bus bar to the lower TCO, for example. With reference to the material layer thicknesses depicted in FIG. 1, material with a thickness of $t_{remove}$ (e.g., about 1200 nm) would need to be removed to cleanly expose the lower TCO 120 via laser ablation for application of the bus bar. Although the sub-layer (e.g., buffer layer 118 shown in FIG. 1) is shown cleanly removed after laser ablation in certain illustrated examples, in other cases, only a substantial portion of the sub-layer is removed.

Figure 2C:
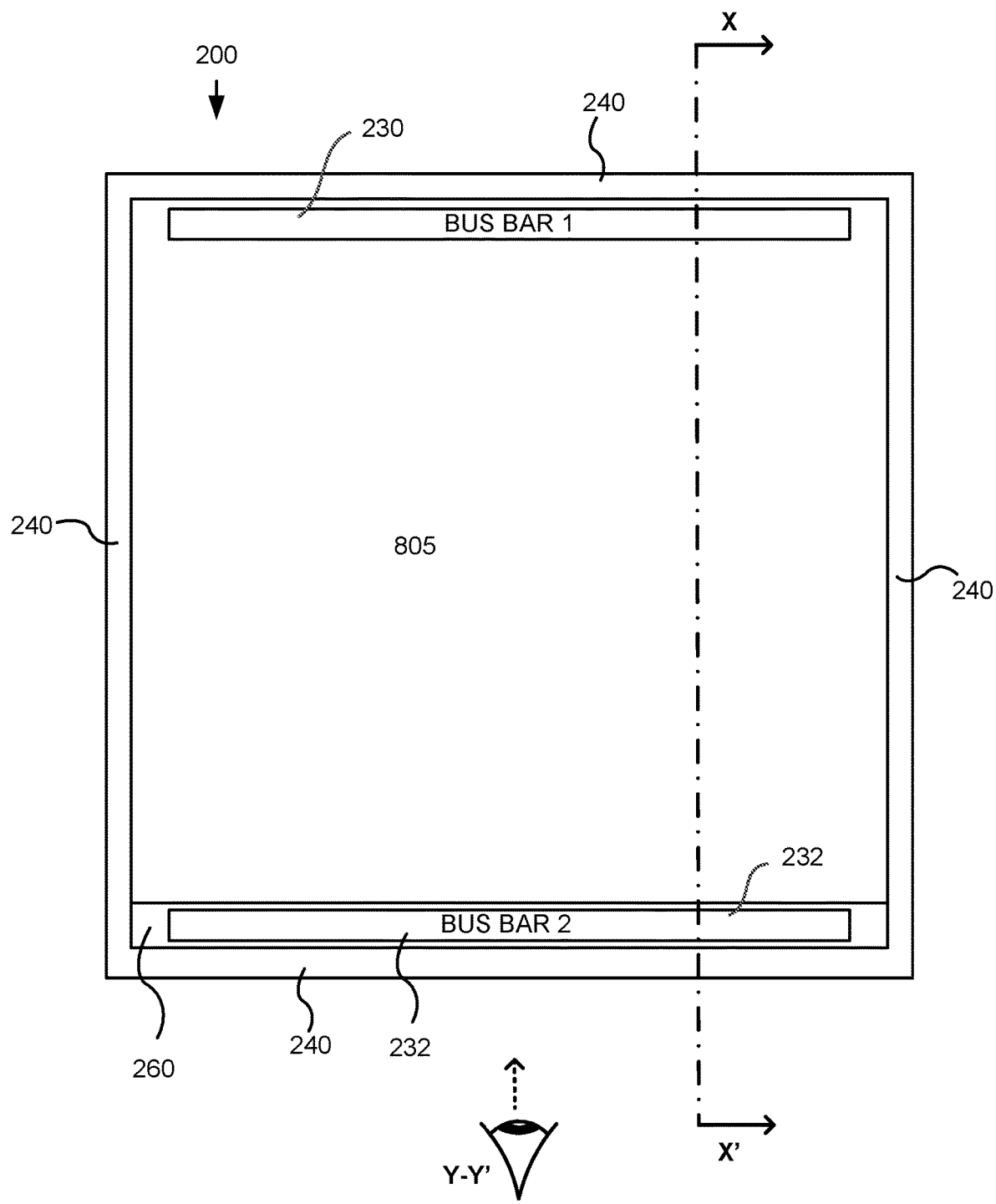
FIG. 2C is a schematic top view of the electrochromic device described in relation to FIGS. 2A and 2B.

FIGS. 2A and 2B are schematic illustrations of a construction, 200, comprising an EC device fabricated on a substantially transparent substrate (e.g., glass substrate). FIG. 2C is a top view schematic drawing of the construction in FIGS. 2A and 2B. FIG. 2A depicts cross-section X-X', and FIG. 2B depicts view Y-Y', as indicated in FIG. 2C. The construction 200 shown in FIGS. 2A-2C is similar to the construction 100 shown in FIG. 1. The construction 200 includes an electrochromic (EC) device fabricated on the substrate. The EC device comprises a diffusion barrier disposed over a lower TCO and a buffer layer disposed over the lower TCO. The EC device further comprises an electrochromic stack disposed over the buffer layer. The EC stack includes an EC layer, an IC layer, and a CE layer. The EC device further comprises an upper TCO over the EC stack. The IC layer may be a separately deposited IC layer or may be an interfacial region created between the contacting and separately deposited EC and EC layers. A bus bar 1 230 is disposed on the upper TCO of the electrochromic device and a bus bar 2 232 is disposed on the lower TCO of the electrochromic device. The pair of bus bars, bus bar 1 230 and bus bar 2 232 are configured to be electrically connected to the corresponding TCOs in order to apply a voltage/current across the EC stack.

In the construction illustrated in FIGS. 2A-2C, edge deletion areas, 240, about the perimeter, can be formed using laser ablation, for example, in an edge deletion operation to remove the material layers above the substrate to leave clean edges about the perimeter of the EC device. In one case, the edge delete width about the perimeter is between about 1 mm and about 20 mm wide. In another case, the edge delete width about the perimeter is between about 5 mm and about 15 mm wide. In yet another case, the edge delete width about the perimeter is between about 8 mm and about 10 mm wide. In this particular construction, there are no laser isolation scribes used to isolate the active region from any inactive regions of the device stack, that is, there are no inactive device regions in the final construct by virtue of not having to use laser isolation scribes. Such laser patterning is described in U.S. patent application Ser. No. 14/362,862 titled "THIN-DEVICES AND FABRICATION," and filed on Jun. 4, 2014, which is hereby incorporated by reference in its entirety.

The illustrated example also depicts a bus pad expose (BPE) 260 in FIG. 2C. The BPE 260 is a portion of the lower TCO that is exposed so that the bus bar 2 232 can be formed thereon and with electrical contact to the lower TCO. The portion of the layers of the EC device down to the lower TCO can be removed in a BPE operation to create a landing for the bus bar 2 232. Formation of the edge delete areas 240 and BPE 260 can be performed in any order. In one embodiment, the edge deletion operation is performed before the BPE operation.

As mentioned above, a BPE (e.g., BPE 260 in FIG. 2C) can refer to a portion of the layers of an EC device that is removed down to the lower electrode (e.g. lower TCO) to create a surface for a bus bar to be applied and make electrical contact with the electrode. The bus bar applied can be a soldered bus bar, an ink bus bar, and the like. A BPE typically has a rectangular area, but this is not necessary; the BPE may be any geometrical shape or a random shape. For example, depending upon the need, a BPE may be circular, triangular, oval, trapezoidal, and other polygonal shapes. The shape may be dependent on the configuration of the EC device, the substrate bearing the EC device (e.g. an irregular shaped window), or even, e.g., a more efficient laser ablation pattern used to create it. In one embodiment, the BPE substantially spans one side of an EC device and is wide enough to accommodate the bus bar with space at least between the EC device stack and the bus bar. In one embodiment, the BPE is substantially rectangular, the length approximating one side of the EC device and the width is between about 5 mm and about 15 mm, in another embodiment between about 5 mm and about 10 mm, and in yet another embodiment between about 7 mm and about 9 mm. As mentioned, a bus bar may be between about 1 mm and about 5 mm wide, typically about 3 mm wide.

The BPE is typically, but not necessarily, made wide enough to accommodate the bus bar's width and also leave space between the bus bar and the EC device (as the bus bar is only supposed to touch the lower electrode). The bus bar width may exceed that of the BPE (and thus there is bus bar material touching both lower conductor and glass), so long as there is space between the bus bar and the EC device. In embodiments where the bus bar width is accommodated by the BPE, that is, the bus bar is entirely atop the lower conductor, the outer edge, along the length, of the bus bar may be aligned with the outer edge of the BPE, or inset by about 1 mm to about 3 mm. Likewise, the space between the bus bar and the EC device is between about 1 mm and about 3 mm, in another embodiment between about 1 mm and 2 mm, in another embodiment about 1.5 mm. Formation of BPE's is described in more detail below, with respect to an EC device having a lower electrode that is a TCO. This is for convenience only, the electrode could be any suitable electrode, transparent or not.

To form a BPE, an area over the lower electrode (e.g., TCO) is cleared of material so that a bus bar can be fabricated at the BPE. In certain embodiments, this can be achieved by laser ablation of the material above a pre-treated buffer layer above the lower TCO. This can selectively remove the deposited material layers while leaving the lower TCO exposed in a defined area at a defined location (i.e. at the BPE).

In certain embodiments with an electrochromic device, the relative absorption properties of the transparent lower electrode and the pre-treated sub-layer (e.g., buffer layer) and any layers deposited over the pre-treated sub-layer may be exploited in order to achieve selective removal during laser ablation to form the BPE. That is, pre-treating the sub-layer can increase its absorption properties. During laser ablation, the pre-treated sub-layer will absorb the energy more readily and be selectively removed (or substantially removed) along with any material layers disposed on top of the sub-layer to leave the lower electrode (e.g. lower TCO) substantially intact. In certain cases, the upper portion of the lower electrode layer may also be removed in order to ensure good electrical contact of the bus bar with the lower electrode, that is, by removing any mixture of TCO and EC materials that might have occurred during deposition in that upper portion of the lower electrode.

In certain embodiments, the same electromagnetic radiation (e.g., laser radiation) used to form the BPE can be used to perform edge deletion in the same EC device. In certain cases, the electromagnetic radiation from a laser source is delivered to the substantially transparent substrate using either optical fiber(s) or the open beam path. In embodiments that use electromagnetic radiation from a laser source, laser ablation can be performed from either substrate side or the film side depending on the choice of the electromagnetic radiation wavelength. The laser energy density required to ablate the material layer thickness is achieved by passing the laser beam through a lens. The lens focuses the laser beam to the desired shape and size. In one case, the energy density is between about 0.5 J/cm2 and about 4 J/cm2.

I. Fabrication Methods Comprising Pre-Treating Sub-Layer of an Optical Device

Certain embodiments pertain to methods of fabricating an optical device, where each method comprises, in the following order: (a) exposing a sub-layer of the optical device to an energy source, (b) depositing one or more material layers of the optical device on the sub-layer, and (c) ablating the one or more material layers and the sub-layer with a laser to expose the underlying layer (e.g., a lower conductor layer). In some cases, exposing the sub-layer to the energy source can alter the absorptive properties of the sub-layer and, in some cases, also the underlying material layer(s). In one embodiment, (a) is performed only on a portion of the area of the sub-layer and (c) is performed substantially on the same corresponding portion of the sub-layer. That is, ablation energy is applied, in this embodiment, to a portion of the top layer that is a perpendicular projection of the portion of the underlying layer that was pre-treated in step (a). This portion may define the area that is selectively ablated in (c). The energy source used in (a) may be the laser used in (c), may be another laser, or may be plasma. For example, plasma etching using various gas plasmas, e.g. halogens such as fluorine, chlorine and/or bromine, is well known to remove material layers in electronic device fabrication. In certain cases, the optical device may be an electrochromic device. In one embodiment where the optical device is an electrochromic device, the method further comprises fabricating a bus bar on the lower conductor layer (e.g., lower TCO) that exposed in (c). These embodiments are described with reference to the process flow illustrated in FIG. 3.

In certain embodiments, the sub-layer comprises titanium dioxide ($TiO_2$) and, in some cases, the sub-layer may consist of $TiO_2$. $TiO_2$ has proven useful in many electronic device applications, including optical device applications, yet without any pre-treatment, its absorption characteristics can make it difficult to ablate, especially after one or more material layers have been deposited on top of it. In order address this issue, the pre-treatment methods of embodiments expose the sub-layer comprising $TiO_2$ to the energy source to increase the absorptive properties of this sub-layer, which may increase absorption of laser energy for less difficult ablation. In some cases, the underlying layers may also receive energy from the energy source and its properties may change accordingly. For example, if the underlying layer comprises tin oxide (e.g., $SnO_2$) and receives energy, its absorptive properties may be decreased as a result. In some embodiments, the sub-layer being pre-treated comprises $TiO_2$ and the underlying layer(s) comprises tin oxide. In these cases, pre-treatment of the sub-layer comprising $TiO_2$ may increase the optical absorption of the $TiO_2$ sub-layer while simultaneously increasing the optical transmission of the underlying tin oxide layer. These changes to the relative absorptive properties of the sub-layer and/or underlying layer can enable selective removal of the pre-treated portion of the sub-layer and the corresponding portion of any layer or layers deposited on the pre-treated sub-layer.

As discussed above with reference to FIG. 1 and FIGS. 2A-2B, in embodiments where the optical device is an electrochromic device, the electrochromic device may include a $WO_3$ electrochromic layer and a nickel-based counter electrode layer. Exemplary nickel-based counter electrode layers include doped NiO, e.g. NiWO, NiTaO, and the like.

In embodiments where the optical device is an electrochromic device, the sub-layer may be on top of and directly adjacent to, the lower conductor layer of the electrochromic device. In one embodiment, the lower conductor layer includes tin oxide (e.g., $SnO_2$). In the low-e window field, some transparent conductive oxides (TCOs) such as fluorinated tin oxides are formed on glass substrates and may serve as the lower conductor layer. Some examples of conductive layer coated glasses are TEC Glass™ by Pilkington, of Toledo, Ohio and SUNGATE™ 300 and SUNGATE™ 500 by PPG Industries of Pittsburgh, Pennsylvania. TEC Glass™ is a glass coated with a fluorinated tin oxide conductive layer.

In certain embodiments where the optical device is an electrochromic device, the sub-layer being exposed to an energy source in step (a) may be a $TiO_2$ buffer film (i.e., a buffer film comprising that $TiO_2$) that is deposited adjacent to a lower transparent conductor layer of the electrochromic device. For example, the sub-layer in FIG. 1 is the buffer layer 118 disposed over the lower TCO 120 of the illustrated electrochromic device. As another example, the sub-layer in FIGS. 2A-2C is the buffer layer disposed over the lower TCO of the illustrated electrochromic device. In certain cases, these buffer layers may be $TiO_2$ buffer films. In selected material removal areas, e.g., where a bus bar is to be applied after the later applied electrochromic device layers are removed from a selected BPE area, the $TiO_2$ buffer film may be subjected to a pre-treatment by an energy source prior to depositing the remaining electrochromic layers. The pre-treatment alters the characteristics of the $TiO_2$, and enables selective removal using a laser source of the $TiO_2$ buffer film and the electrochromic film stack from the underlying TCO in the area that was pre-treated. The pre-treatment exposure can be via a laser source and/or a localized plasma. For example, plasmas including atmospheric $O_2$, $N_2/H_2$, halogens, or other gases, reactive or not, may be used (reactive plasmas may chemically change the $TiO_2$ film making more absorptive, while a nonreactive plasma may structurally alter the $TiO_2$ without necessarily changing it chemically. After fabricating the electrochromic film stack, the pre-treatment area is then exposed to a laser source for ablation of the $TiO_2$ buffer film and electrochromic film stack thereon. Laser ablation results in uncovering the underlying TCO, allowing for good electrical contact with the bus bar applied to the exposed TCO.

Although some embodiments described herein include a sub-layer (e.g., buffer layer) that is described as comprising $TiO_2$, the sub-layer may be made of various materials and have various properties. In certain embodiments, the sub-layer may include, for example, a metal oxide, a metal nitride, a metal carbide, a metal oxynitride, or a metal oxycarbide. In one case, the sub-layer may comprise a metal oxide selected from the group consisting of aluminum oxide, titanium oxide, $TiO_2$, tantalum oxide, cerium oxide, zinc oxide, tin oxide, silicon aluminum oxide, tungsten oxide, nickel tungsten oxide, and oxidized indium tin oxide. In one case, the sub-layer may comprise a metal nitride selected from the group consisting of titanium nitride, aluminum nitride, silicon nitride, tantalum nitride, and tungsten nitride. In one case, the sub-layer may comprise a metal carbide selected from the group consisting of titanium carbide, aluminum carbide, silicon carbide, tantalum carbide, and tungsten carbide. An example of a sub-layer that is a buffer layer in an electrochromic device is the defect-mitigating insulating layer described in U.S. patent application Ser. No. 13/763,505, entitled "DEFECT-MITIGATION LAYERS IN ELECTROCHROMIC DEVICES," filed on Feb. 8, 2013, which is hereby incorporated by reference in its entirety.

The pre-treatment operation involves exposing at least a portion of the sub-layer of the optical device to an energy source. In certain embodiments, the energy source is a laser source. In these cases, pre-treatment involves heating the sub-layer (e.g., $TiO_2$ layer) very quickly (for example, within 10-500 nanoseconds) to temperatures exceeding 400° C. to increase the optical absorption properties of the sub-layer. In one case, the sub-layer is heated within 10-20 nanoseconds. If the sub-layer comprises $TiO_2$ and the underlying layer comprises tin oxide (e.g, $SnO_2$), the pre-treatment may increase optical absorption of the $TiO_2$ layer while simultaneously increasing the optical transmission of the underlying tin oxide. In addition, pre-treatment of a sub-layer comprising $TiO_2$ can also localize cracking of the $TiO_2$ at sufficient laser fluences. After deposition, laser energy is more highly absorbed by the pre-treated sub-layer (e.g., $TiO_2$ layer) as compared to the un-treated sub-layer, so that pre-treatment increases selectivity of the process of removal of pre-treated sub-layer. In some cases, the laser firing frequency during pre-treatment may be set to 10 kHz.

In other embodiments, the energy source is a plasma. Using a plasma, pre-treatment involves exposing the surface of the sub-layer (e.g., $TiO_2$ layer) to an atmospheric-pressure plasma, resulting in cracking of the surface and higher absorption of water into the underlying layer(s) of, for example, of a film stack. In some embodiments, the plasma pre-treatment is performed selectively on an area or areas of the sub-layer (e.g., films) that are to be removed after optical device fabrication thereon. After deposition of subsequent electrochromic film layers, the morphology of the sub-layer (e.g., $TiO_2$ layer) results in higher absorption of the laser energy in the pre-treated areas, resulting in increased selectivity of the process to removal of sub-layer in the pre-treated areas.

In certain aspects, pre-treatment process includes the intentional alteration of a $TiO_2$ film or other sub-layer for increased laser absorption through alteration of material properties (extinction coefficient, optical absorption) and morphology (localized cracking/discontinuity) in the $TiO_2$ film or other sub-layer. During fabrication of electrochromic devices, applying these processes before the remaining layers of the electrochromic film are deposited enables greater control and selectivity of the laser removal process after the remaining layers of the electrochromic film stack have been deposited. As discussed above, the sub-layer need not be $TiO_2$, but can be other materials whose absorption characteristics make them difficult to remove after one or more material layers have been deposited thereon. Embodiments described herein widen the process window in which good electrical contact can be made between bus bar and lower TCO, hence improving manufacturing consistency and factory yield.

Figure 3:
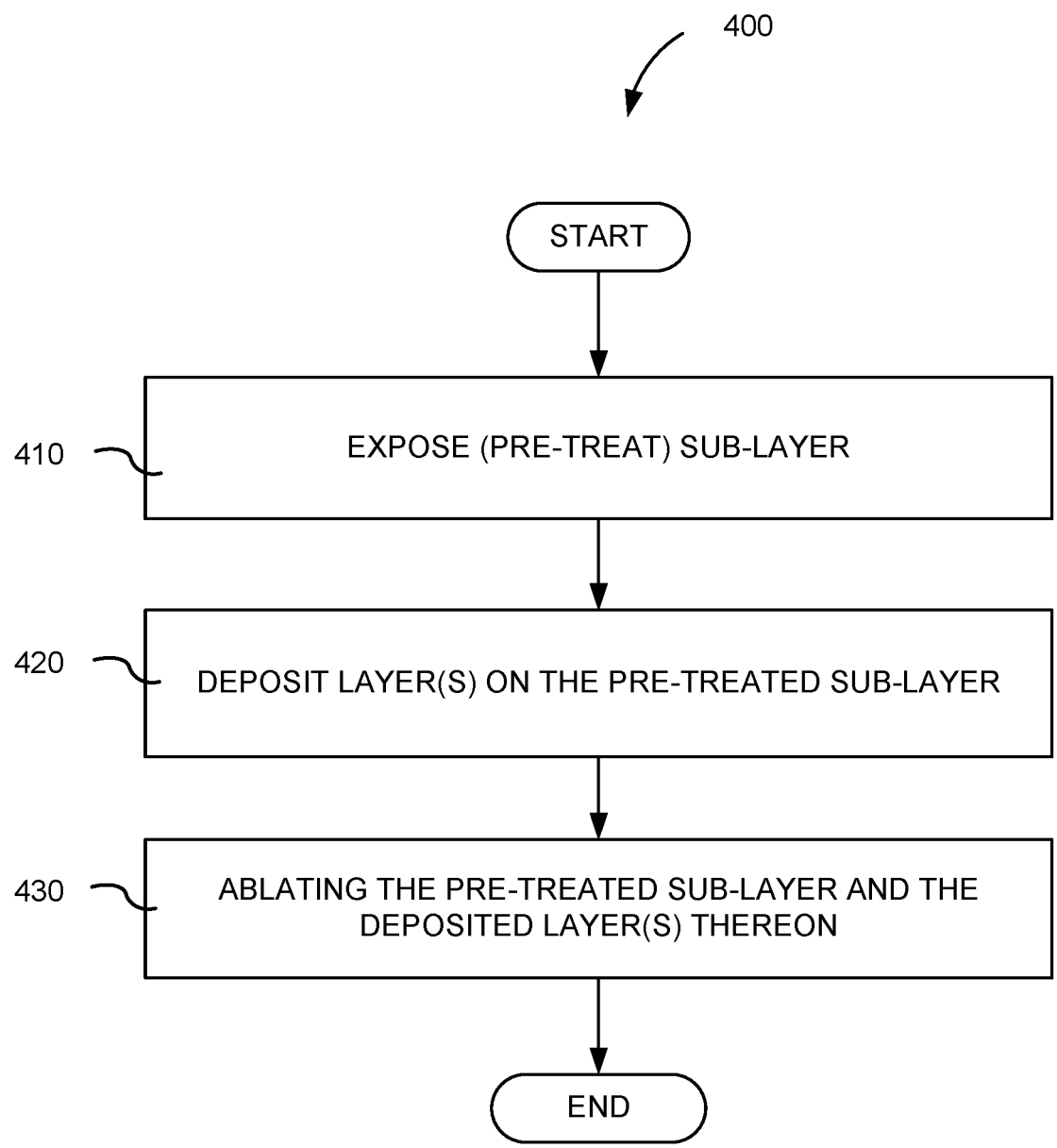
FIG. 3 is a flowchart of a process flow describing aspects of methods of fabricating an optical device (e.g., electrochromic device), according to embodiments.

FIG. 3 is a flowchart of a process flow 400 describing aspects of a method of fabricating an optical device (e.g., electrochromic device) according to embodiments that involve pre-treating a sub-layer of the optical device. Although these embodiments are described with reference to electrochromic devices in some cases, these methods can be used with other optical devices.

At step, 410, a surface of a sub-layer of an optical device is exposed to energy from an energy source. The energy source applied can be from a laser source and/or localized plasma (e.g., atmospheric $O_2$, $N_2/H_2$, halogens or other gases may be used). The sub-layer is disposed over an underlying layer(s). In some cases, the sub-layer may comprise $TiO_2$ and/or the underlying layer may comprise $SnO_2$. In cases where the optical device is an electrochromic device, the sub-layer may be a buffer layer (e.g., buffer layer 118 in FIG. 1) over a lower TCO or may be a layer (e.g., diffusion layer) over the substantially transparent substrate. Exposing the sub-layer to the energy source may alter the properties and/or morphology of the sub-layer and/or the underlying layer(s), particularly the absorptive properties as described herein.

In some cases, only a portion of the surface area of the sub-layer is exposed to the energy source in step 410. This portion can define the desired area that will be selectively removed (e.g., ablated) in step 430. An example of a portion of a sub-layer that may be exposed in step 410 is the BPE 260 on the lower TCO, which is shown in FIGS. 2A-2C. Another example of portions of a sub-layer are edge delete areas 240 that may be located on a layer (e.g., diffusion layer) over the substantially transparent substrate. In certain cases, this portion may be about or slightly larger than the area that is desired to be removed later. For example, by making the initially exposed area slightly larger than the area that is ultimately removed, a perimeter of the exposed material is left behind. This may be advantageous if the material is, e.g., more insulating than it would otherwise be if not exposed to the energy. This peripheral material might then act as an insulating material between a bus bar and the device stack to ensure the bus bar does not make direct contact with the edge of the device stack layers (overlying the TCO to which it does make electrical connection). This peripheral material might also act to "contain" bus bar ink prior to curing, as it is higher in profile and may surround the area where the bus bar ink is deposited or at least serve as a dam to impede the flow of bus bar ink toward the device stack.

At step 420, one or more material layers are deposited on the pre-treated sub-layer. In embodiments where the optical device is an electrochromic device, step 420 may comprise depositing the EC stack and/or upper TCO over the pre-treated sub-layer such as, for example, to form the EC device shown in FIG. 1 or FIGS. 2A-2C.

At step 430, the optical device is ablated with a laser source to at least substantially remove the pre-treated sub-layer and the one or more material layers deposited over the pre-treated layer. The laser source used in this step 430 for ablation may be the same energy source used in step 410.

In some cases, only a portion of the sub-layer and overlying layer(s) is ablated in step 430. For example, the ablation energy may be applied to a selected area of the optical device that is desired to be removed. In certain aspects, this selected area may correspond to the portion of the sub-layer that was pre-treated (exposed) in step 410. An illustrated example of area of an electrochromic device that may be selected for ablation is the BPE 260 shown in FIG. 2C. In embodiments where the optical device is an electrochromic device, step 430 may comprise removing the buffer layer over the lower TCO and the material layers of an electrochromic film stack and/or upper TCO over the buffer layer. This step may result in revealing the underlying conductive TCO appropriately (e.g. cleanly removing any overlying material layers) to allow for good electrical contact with a bus bar applied to the exposed lower TCO. In step 430, the pre-treated sub-layer and overlying layer(s) are substantially removed, some de minimus amount of material from these layers may remain. This residual material may be removed in additional operations, for example, by mechanical means, by additional ablation operations, etc. In other cases, the pre-treated sub-layer and overlying layer(s) are cleanly removed in step 430.

In certain aspects, the illustrated method shown in FIG. 3 may include additional processing steps used in fabricating optical devices. In cases where the optical device is an electrochromic device, for example, the method may further comprise fabricating a bus bar over the underlying layer exposed in step 430. In this case, the underlying layer is a lower conductor (e.g., lower TCO in FIGS. 1, 2A, and 2B). Additional processing steps that can be included in the illustrated method can be found in PCT International Application No. PCT/US2012/068817, titled "THIN-FILM DEVICES AND FABRICATION," and filed on Dec. 10, 2012, and U.S. patent application Ser. No. 13/456,056, titled "ELECTROCHROMIC WINDOW FABRICATION METHODS," filed on Apr. 25, 2012.

In certain aspects, methods of embodiments described herein can selectively remove thin films from an optical device to reveal underlying transparent conductor layers. These methods can be used to selectively remove material layers from an electrochromic device to reveal the lower TCO layer, for example. During fabrication of electrochromic devices, the lower TCO may need to be locally exposed for application of a bus bar to the exposed area. In these cases, the method may be exposing the lower TCO layer and the sub-layer being pre-treated may comprise one or more buffer layers (e.g., $SnO_2$ and $TiO_2$ buffer films) deposited over the lower TCO, for example, prior to depositing the electrochromic film stack. The pre-treatment alters the characteristics of the $TiO_2$ and hence enables selective removal of the $TiO_2$ and any layers deposited on the buffer layer(s) from the underlying TCO layer using a laser source. For example, if the lower TCO is being exposed, the electrochromic film stack may be deposited over the pre-treated buffer layer(s), and the pre-treatment area is exposed to a laser source for ablation of the $TiO_2$ and electrochromic film stack. The results in exposure of the underlying lower TCO, which can allow for good electrical contact with a bus bar applied to the exposed area of the TCO.

II. Experimental Results from Pre-Treatment of an Electrochromic Device

Experimental results in this section are based on an EC device similar to the one illustrated in FIG. 1 with the material layers and thicknesses shown. The EC device includes a buffer layer comprising $TiO_2$ (i.e. a $TiO_2$ layer) on a lower TCO (of, e.g., fluorinated tin oxide). The EC stack includes an electrochromic layer (e.g., $WO_3$ layer) a counter electrode layer (e.g., NiWO) and an upper TCO (indium tin oxide) in the thickness shown. Experiments were performed where the material layers were laser ablated in an attempt to remove all the layers down to and including the $TiO_2$ layer in order to reveal the lower TCO for a bus bar application. In this EC device, approximately 1200 nm of material was needed to be removed (i.e. $t_{remove}$ was 1200 nm) in order to cleanly expose the lower TCO via laser ablation. The $TiO_2$ layer was approximately 10-50 nm thick.

Figure 4:
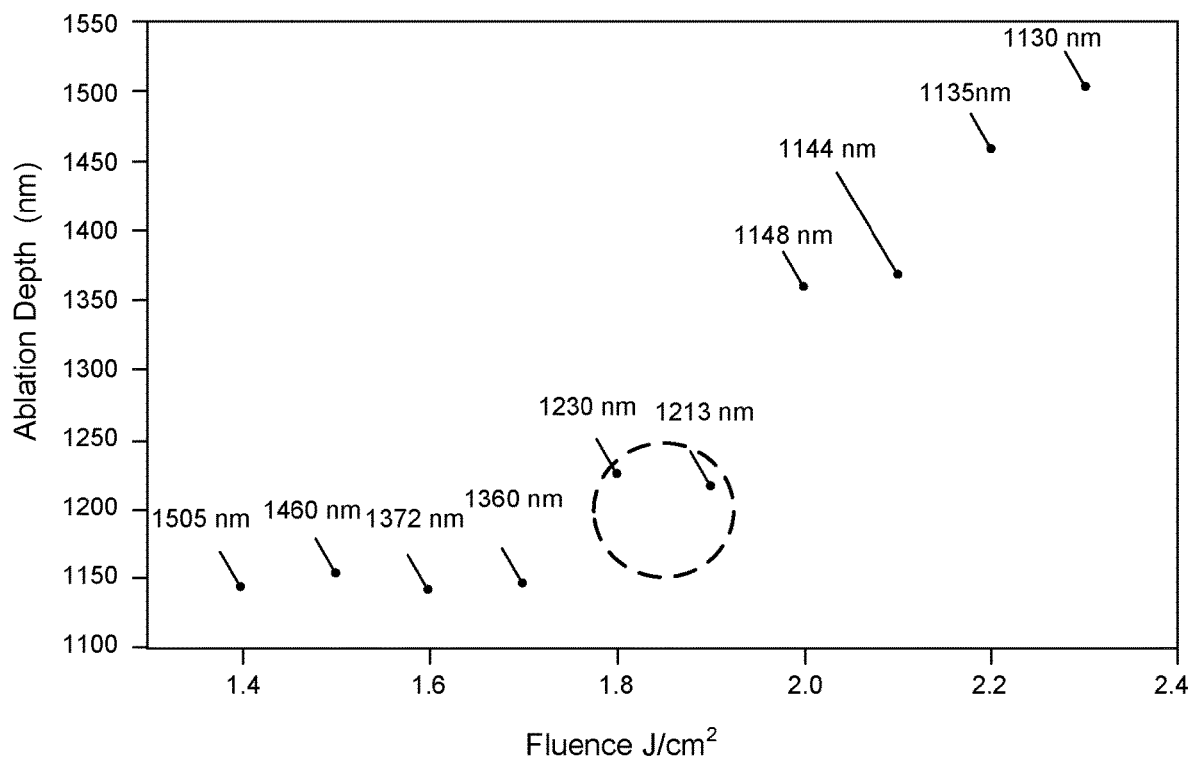
FIGS. 4 and 5 are graphs showing experimental results comparing laser ablation depth vs. fluence, to ablate down to an un-treated sub-layer of an electrochromic device, using high pattern overlap and high spot overlap laser ablation, respectively.
Figure 5:
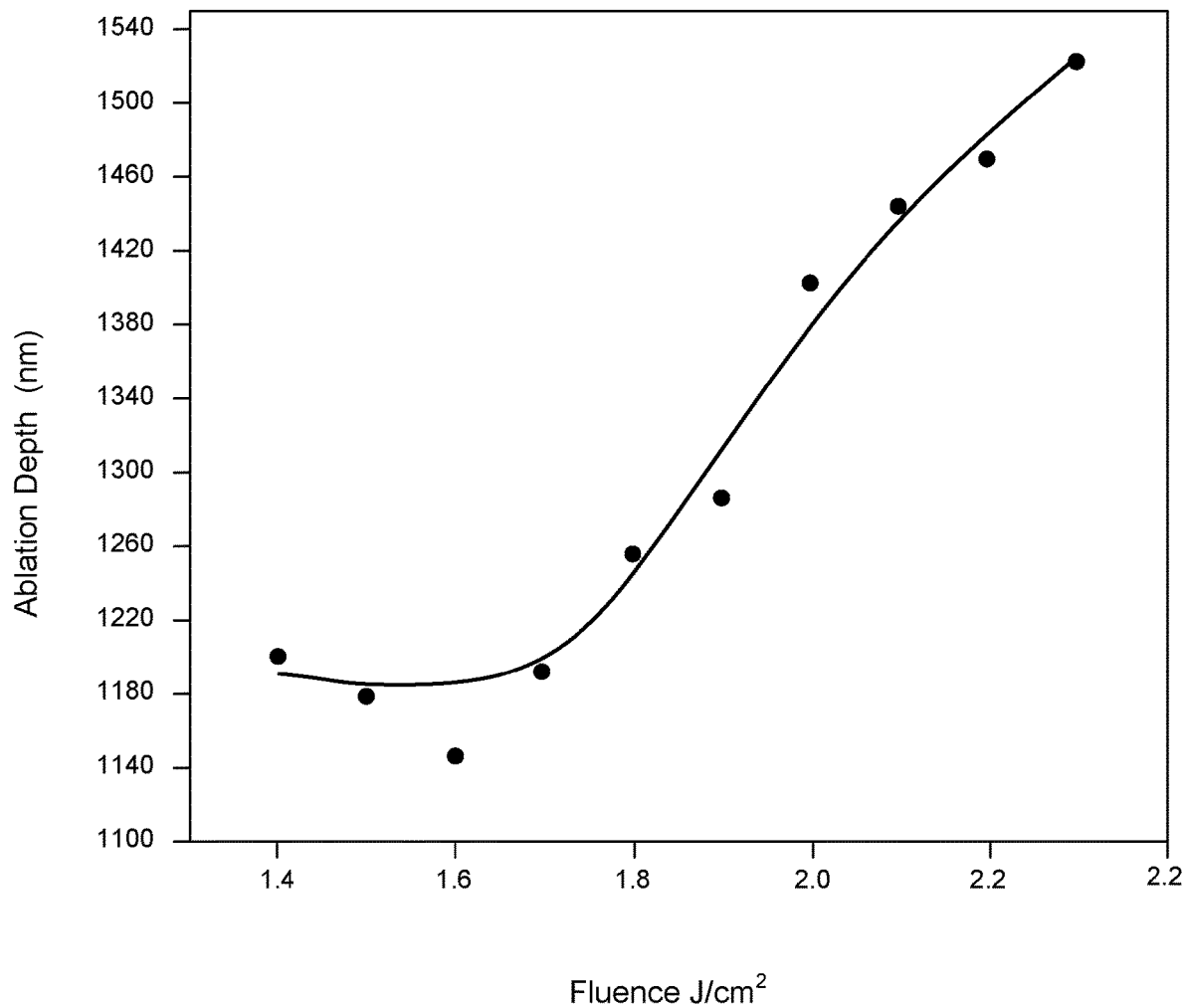
Figure 6:
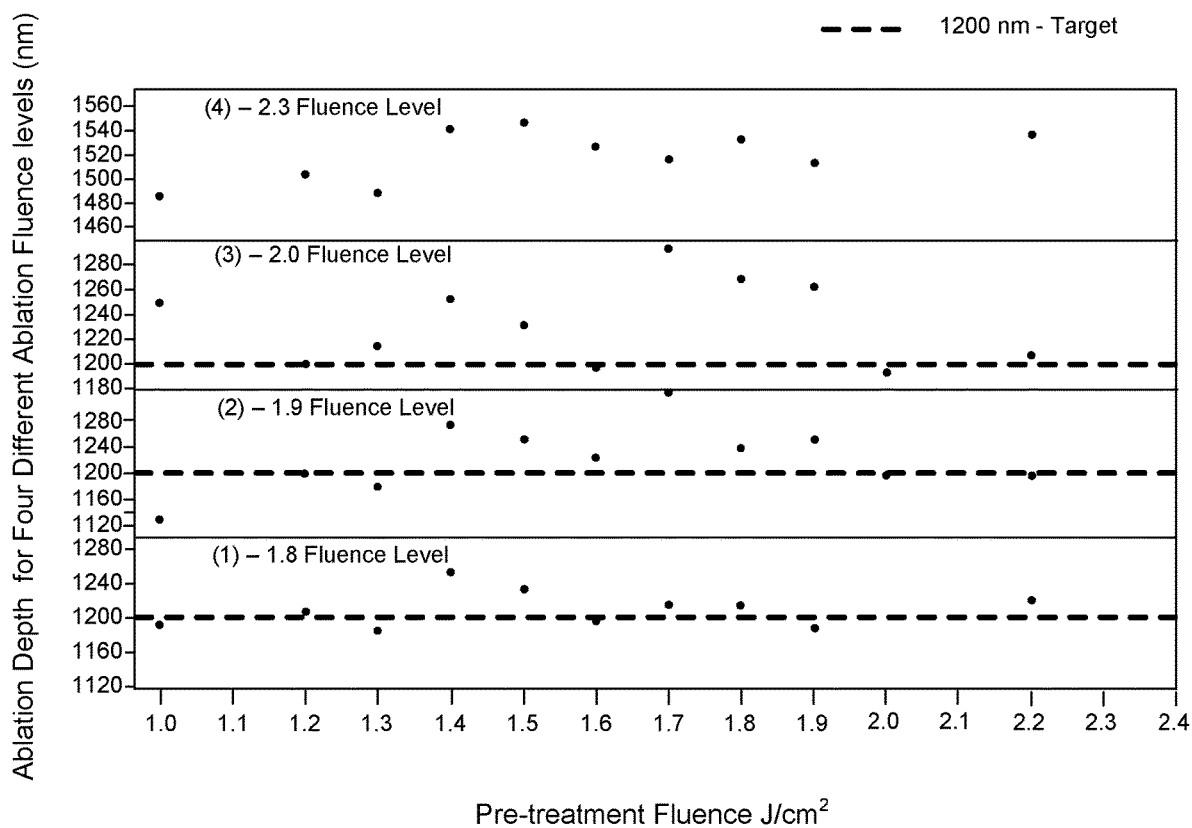
FIG. 6 is a graph showing experimental results of laser ablation down to a pre-treated buffer layer in an electrochromic device, according to embodiments.

Experiments were run for both without pre-treatment (control) and with pre-treatment of the $TiO_2$ layer prior to deposition of the layers on top of the $TiO_2$. FIGS. 4 and 5 show results for the control case where the $TiO_2$ layer is not pre-treated. FIG. 6 shows results when the $TiO_2$ layer has been pre-treated prior to deposition of the layers on top of the $TiO_2$.

FIGS. 4 and 5 show the graphical results of the ablation depth vs. fluence (i.e., laser energy), using high pattern overlap and high spot overlap, respectively. High overlap in this context means that a significant amount of the laser pattern or spot was overlapped with subsequent laser patterns or spots in order to accomplish the desired ablation depth (e.g., about 1200 nm). High spot overlap results in higher heating and therefore less fluence is required to ablate the material layers to the desired 1200 nm ablation depth. Referring to the illustrated results shown in FIGS. 4 and 5, it can be noted that a very narrow process window results in the control experiments. Referring to FIG. 4 that uses high pattern overlap, for example, ablation depth that is close to 1200 nm as shown by the dotted circle could only be achieved with application of laser fluence at about 1.8 and 1.9 $J/cm^2$, that is, within a tight range of 0.1 $J/cm^2$. Referring to FIG. 5 that uses high spot overlap, an ablation depth of about 1200 nm was achieved only with application of laser fluence between 1.7 and 1.80 $J/cm^2$, again within a tight range of only 0.1 $J/cm^2$. In FIG. 5, the data point at fluence level of 1.4 J/cm2 may be high due to measurement noise.

Pre-treating the sub-layer can widen the process window of the laser fluence levels needed to ablate to the desired ablation depth. That is, the range of laser fluence levels that can be used to accomplish a desired laser ablation depth may be widened if pre-treatment is used on the sub-layer being ablated. For example, with reference to the electrochromic device used in the experiments in this section, by pretreating the $TiO_2$ buffer layer prior to depositing the remaining material layers of the electrochromic device, and then laser ablating, a much wider process window can be achieved in the removal step. This is shown in FIG. 6. The x-axis of the graph in FIG. 6 represents pre-treatment laser fluence levels applied to the $TiO_2$ buffer layer in the electrochromic device. The y-axis shows the ablation depth at four laser ablation fluence levels: (1) 1.8 $J/cm^2$, (2) 1.9 $J/cm^2$, (3) 2.0 $J/cm^2$, and (4) 2.3 $J/cm^2$. The results show the different ablation depths achieved by these four laser ablation fluence levels (y-axis) based the fluence level used to pre-treat the sub-layer (x-axis). The dotted lines in the x-direction denote the desired target ablation depth of 1200 nm. For the laser ablation level of 2.3 $J/cm^2$, there is no dotted line because this fluence level resulted consistently removing not only the pre-treated buffer layer, but also a substantial portion of the underlying TCO (thus 2.3 $J/cm^2$ was too high fluence level). As shown, pre-treatment of the sub-layer with a fluence level between about 1.0 and 2.0 $J/cm^2$ allowed for removal of the desired ablation depth about (1200 nm) for not only 1.8 and 1.9 $J/cm^2$ ablation fluence levels, but also for 2.0 $J/cm^2$ ablation fluence. Thus, the range of ablation fluence levels for the desired ablation depth was increased (doubled) as compared to control—a much larger process window for ablation was achieved using pre-treatment of the sub-layer (and the pre-treatment has a wide process window as well, between 1.0 and 2.2 J/cm² fluence levels).

III. Fabrication Methods with a Sacrificial Material Layer

In certain embodiments, a sacrificial material layer is applied to a selected area of the one or more sub-layers of an optical device. The material and thickness used in this sacrificial material layer are selected to provide desired absorptive properties) that allow for control over the thermal flux once the laser ablation of the selected area is performed. For example, the material and thickness of the sacrificial material layer may be selected to control the thermal flux to a bus bar pad expose of a buffer layer in order to expose a lower TCO for bus bar application in an electrochromic device.

Thus, certain embodiments are directed to a method of fabricating an optical device that includes applying a sacrificial material layer during the deposition process. In certain cases, the method comprises: i) applying a sacrificial material layer (e.g., thin film) to one or more sub-layers of the optical device; where the sacrificial material layer is applied only to a portion of the area of the one or more sub-layers of the optical device; ii) depositing one or more material layers of the optical device on the sacrificial material layer and the one or more sub-layers; and iii) applying a laser to the portion to ablate the optical device at least down to the sacrificial material layer. The optical device can be an electrochromic device. The one or more sub-layers may include a buffer layer such as a buffer layer comprising $TiO_2$. In one embodiment, the electrochromic device includes a $WO_3$ electrochromic layer and a nickel-based counter electrode layer. The nickel-based counter electrode layer may include NiWO or NiTaO. In certain embodiments, the one or more sub-layers are on top of and directly adjacent to, the lower conductor layer (e.g., lower TCO) of the electrochromic device. In certain cases, the lower conductor layer may comprise $SnO_2$. In certain embodiments, the lower conductor layer is substantially intact after iii). In one embodiment, the method further includes fabricating a bus bar on the lower conductor layer exposed in iii).

Figure 7:
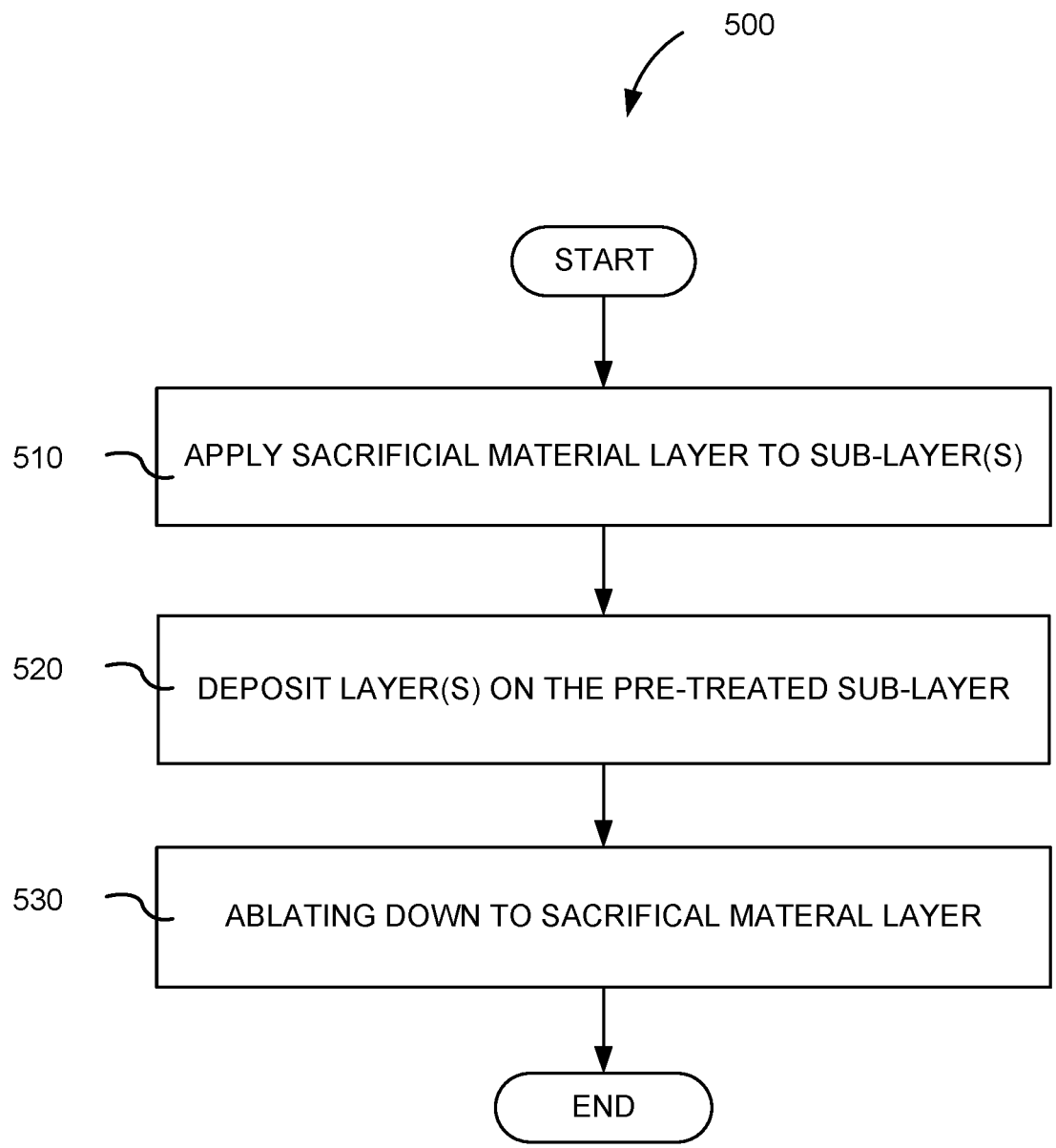
FIG. 7 is a flowchart of a process flow describing aspects of methods of fabricating an optical device (e.g., electrochromic device), according to embodiments.

FIG. 7 is a flowchart of a process flow 500 describing aspects of a method of fabricating an optical device (e.g., electrochromic device) according to embodiments that involve applying a sacrificial material layer to a sub-layer. Although these embodiments are described with reference to electrochromic devices in some cases, these methods can be used with other optical devices.

At step, 510, a sacrificial material layer is applied to one or more sub-layers of an optical device. The material and thickness of the sacrificial material layer may be selected to provide a desired absorptive property for a predefined thermal flux that will be used in laser ablation in step 530. In certain cases, the sacrificial material layer is applied only to a portion of the available surface area of the one or more sub-layers of the optical device. This portion corresponds approximately to the area that will be targeted in the laser ablation in step 530.

At step 520, one or more material layers are deposited on the sacrificial material layer. In embodiments where the optical device is an electrochromic device, step 420 may comprise depositing the EC stack and/or upper TCO over the sacrificial material layer such as, for example, to form the EC device similar to the one shown in FIG. 1 or FIGS. 2A-2C.

At step 530, energy fluence form a laser is directed to the portion of the sacrificial material layer to ablate the optical device down to at least the sacrificial material layer.

In step 530, the sacrificial material layer and overlying layer(s) are at least substantially removed. That is, in some cases, some material from these layers may remain. This residual material may be removed in additional operations, for example, by mechanical means, by additional ablation operations, etc. In other cases, the sacrificial material layer and overlying layer(s) are cleanly removed in step 530.

Although methods described herein may be described, in some cases, with reference to material layers of the electrochromic stack shown in FIG. 1 or the one show in FIGS. 2A and 2B, the methods described herein can also be used with material layers of other optical devices. For example, the methods described herein can be used with other electrochromic devices such as those described in U.S. patent application Ser. No. 12/772,055 (now U.S. Pat. No. 8,300, 298) titled "ELECTROCHROMIC DEVICES," filed on Apr. 30, 2010, which is hereby incorporated by reference in its entirety.

In the description herein, numerous specific details are set forth in order to provide a thorough understanding of the presented embodiments. The disclosed embodiments may be practiced without some or all of these specific details. In other instances, well-known process operations have not been described in detail to not unnecessarily obscure the disclosed embodiments. While the disclosed embodiments will be described in conjunction with the specific embodiments, it will be understood that it is not intended to limit the disclosed embodiments.

Although the foregoing invention has been described in some detail to facilitate understanding, the described embodiments are to be considered illustrative and not limiting. It will be apparent to one of ordinary skill in the art that certain changes and modifications can be practiced within the scope of the appended claims.

What is claimed is:

1. An optical device comprising:
   a substantially transparent substrate;
   a first transparent conductive oxide (TCO) layer disposed on the substantially transparent substrate;
   a bus bar disposed on the first TCO layer in a bus bar pad expose area of the substantially transparent substrate;
   wherein a remaining area of the substantially transparent substrate includes a stack of one or more material layers comprising a titanium dioxide ($TiO_2$) layer disposed on the first TCO layer; and
   wherein the remaining area of the substantially transparent substrate also includes a second TCO layer disposed on top of the stack of one or more material layers.

2. The optical device of claim 1, wherein the optical device is an electrochromic device.

3. The optical device of claim 1, wherein the stack of one or more material layers further comprises a $WO_3$ electrochromic layer and a nickel-based counter electrode layer.

4. The optical device of claim 1, wherein the stack of one or more material layers comprises a tungsten oxide ($WO_3$) electrochromic layer and a nickel-based counter electrode layer.

5. The optical device of claim 1, wherein the stack of one or more material layers comprises a counter electrode layer comprising NiWO or NiTaO.

6. The optical device of claim 1, wherein the first TCO layer and/or the second TCO layer comprises tin oxide.

7. The optical device of claim 1, wherein the stack is an electrochromic device stack.

8. The optical device of claim 1, wherein the TiO$_2$ layer has higher absorptive properties relative to the first TCO layer.

9. The optical device of claim 1, wherein the first TCO layer comprises SnO$_2$.

* * * * *